United States Patent Office 3,189,608
Patented June 15, 1965

3,189,608
TERTIARYAMINOCYCLOBUTANONES AND
THEIR PRODUCTION
James C. Martin, Kingsport, Tenn., assignor to Eastman
Kodak Company, Rochester, N.Y., a corporation of
New Jersey
No Drawing. Filed May 26, 1961, Ser. No. 112,789
20 Claims. (Cl. 260—247.7)

This application is a continuation-in-part of my copending U.S. application Serial No. 71,397, "Substituted Cyclobutanones," filed November 25, 1960, now abandoned.

This invention relates to cyclobutane derivatives.

It is an object of this invention to provide novel substituted cyclobutanones.

It is another object of this invention to provide novel cyclobutane derivatives by a novel process.

It is another object of this invention to provide a new class of cyclobutane derivatives that are useful chemical intermediates.

Other objects of the invention will be apparent from the description and claims which follow.

The novel compounds of the invention are substituted cyclobutane compounds containing a ketone radical and a tertiary amine radical and have the structural formula:

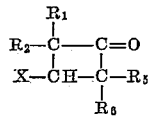

wherein $R_1$ and $R_2$ are hydrogen or monovalent organic radicals or divalent organic radicals which, together with the adjacent carbon atom on the cyclobutane ring, form an organic ring, wherein $R_5$ and $R_6$ can be the same radicals as $R_1$ and $R_2$ and wherein X is a tertiary amine radical having a nitrogen atom attached to the adjacent carbon atom on the cyclobutane ring. The substituent X typically has the formula

or

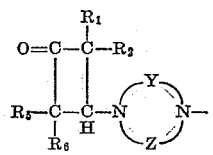

In the above formulas $R_1$ and $R_2$ are typically: (a) alkyl radicals having 1 to 18 carbon atoms; (b) phenyl radicals; (c) thienyl radicals; (d) allyl radicals; (e) carbon and hydrogen atoms which, together with the adjacent carbon atom on the cyclobutane ring, form a carbocyclic ring containing 5 to 7 carbon atoms such as cyclopentane, cyclohexane, norbornane, norbornene and related rings; (f) carbalkoxy radicals wherein the alkoxy moiety has 1 to 8 carbon atoms; (g) carbon, hydrogen and oxygen atoms which, together with the adjacent carbon atom on the cyclobutane ring, form a heterocyclic ring having 5 carbon atoms and an oxygen atom such as pyran rings and the like; or (h) hydrogen. As pointed out above, $R_5$ and $R_6$ can be the same radicals as $R_1$ and $R_2$. In the above formulas $R_3$ and $R_4$ are typically: (a) alkyl radicals having 1 to 8 carbon atoms; (b) carbon and hydrogen atoms which, together with the nitrogen atom, form a heterocyclic ring containing 4 to 8 carbon atoms such as piperidine, methyl-substituted piperidines, pyrrolidine, 3-azabicyclo[3.2.2]nonane and related rings; or (c) carbon, hydrogen and oxygen atoms which, together with the nitrogen atom, form a morpholine ring. In the above formulas Y and Z are alkylene radicals having 2 to 4 carbon atoms and form such ring structures as piperazine and methyl-substituted piperazine rings.

The above described cyclobutane derivatives can be prepared by reacting ketenes and enamines. The reaction of the invention can be represented by the following equation wherein the substituents in the formulas are those as described hereinabove:

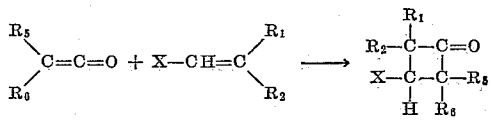

The ketene reactant can be ketene ($H_2C=C=O$), a monosubstituted or aldoketene ($RCH=C=O$), or a disubstituted or ketoketene ($R_2C=C=O$). Such compounds can be prepared by methods known in the art, for instance, by methods described in "Organic Reactions," John Wiley and Sons, Inc., N.Y. (1946) vol. III, chap. 3. The disubstituted ketene reactants can also be prepared by the method described in copending application, Hasek and Elam, U.S. Serial No. 841,961, filed September 24, 1959. Typical ketenes that can be used in the process of the invention include: ketene, methylketene, ethylketene, n-propylketene, isopropylketene, n-butylketene, isobutylketene, phenylketene, dimethylketene, ethylmethylketene, diethylketene, n-butylethylketene, di-n-propylketene, diisobutylketene, di-n-butylketene, di-n-heptylketene, ethyldodecylketene, distearylketene, camphoketene, dibenzylketene, ditolylketene, diallylketene, dicarbethoxyketene, tetramethyleneketene, pentamethyleneketene, diphenylketene, methylphenylketene, allylmethylketene, methylcarbethoxyketene, ethylcarbethoxyketene, n-propylcarbomethoxyketene, and the like.

One type of enamine reactant that can be used in the process of the invention is the type of enamine having no β-hydrogen atoms which can be prepared by reacting an aldehyde having one α-hydrogen atom with a secondary amine. This reaction is described in copending application, Brannock U.S. Serial No. 34,881, filed June 9, 1960. Typical enamines of this type that can be used in the process of the invention include: N,N-dimethylisobutenylamine, N,N-diethylisobutenylamine, N,N-dibutylisobutenylamine, N-isobutenylpiperidine, N-isobutenylpyrrolidine, N,N-dimethyl-2-methylbutenylamine, N-(2-methylbutenyl)piperidine, N,N-dimethyl-2-ethylbutenylamine, N-(2-ethylbutenyl)piperidine, N-(methylenecyclohexyl)dimethylamine, N-(methylenecyclohexyl)piperidine, N-isobutenylmorpholine, N-(2-ethylhexenyl)morpholine, N-(2-ethylhexenyl)piperidine, N,N-dimethyl-2-ethylhexenylamine, 3-isobutenyl-3-azabicyclo[3.2.2]nonane, 5-dimethylaminomethylene-2-norbornene, 2-diisopropylaminomethylene-2-(2,3-dihydro-4H-pyran), 2-(2 - dimethylamino-1-ethyl-vinyl)thiophene, 2-dimethylamino-1,1-diphenylethylene, and the like.

Another type of enamine that can be used in the process of the invention is the type having at least one hydrogen atom on the β-carbon atom. Enamines of this type can be prepared by reacting a secondary amine with an aldehyde having at least two α-hydrogen atoms. Examples of such secondary amines include: simple dialkylamines such as dimethylamine, diethylamine, dibutylamine; heterocyclic secondary amines such as pyrrolidine, piperidine, morpholine, piperazine and 1-methylpiperazine; and secondary aromatic amines such as N-methylaniline. Typical aldehydes having at least two α-hydrogen atoms include: propionaldehyde, butyraldehyde, valeraldehyde, heptaldehyde, acetaldehyde, phenylacetaldehyde, etc. Examples of a few of the resulting enamines having at least one β-hydrogen atom obtained by the reaction of such secondary amines and aldehydes include: N-(1-butenyl)piperidine, N,N-dimethylvinylamine, N,N-dimethylpropenylamine, N-(1-butenyl)pyrrolidine, N,N-dimethyl-1-butenylamine, N,N-dibutyl-1-butenylamine, N-(1-heptenyl)morpholine, and the like.

Although the reactions employing any of the types of ketenes and enamines discussed above and the novel compounds having the cyclobutanone structure obtained by such reactions are within the scope of the invention, it should be noted that there are significant differences between certain classes of the reactants and products. Thus, when the process of the invention employs a ketoketene, such as a dialkylketene, and an enamine having no β-hydrogen atoms, i.e., an enamine prepared from aldehydes having one α-hydrogen atom, the resulting product is a substituted cyclobutanone having no hydrogen atoms on the carbon atoms adjacent to the carbonyl group. In other words, $R_1$, $R_2$, $R_5$ and $R_6$ are substituents other than hydrogen atoms. Compounds of this type are characterized by superior thermal stability.

When the reaction is carried out with a ketene having at least one α-hydrogen atom or an enamine having at least one β-hydrogen atom, the resulting substituted cyclobutanone product of the invention has at least one hydrogen atom on a carbon adjacent to the carbonyl group. In other words, at least one of the substituents, $R_1$, $R_2$, $R_5$ or $R_6$, is a hydrogen atom. Compounds of this type are useful new compounds but are not so stable thermally as the other cyclic compounds of the invention. In order to obtain such compounds in good yield, the reaction of the ketene and the enamine must be carried out at a temperature below about 50° C., preferably below about 10° C., and to avoid decomposition of the compounds they must not be heated to temperatures above about 50° C. for any substantial length of time.

As a general rule it can be said that the thermal stability of the cyclic compounds of the invention increases with an increase in the size of the alkyl substituents on the carbon atoms adjacent to the carbonyl group. For example, a compound of the invention in which the substituents $R_1$, $R_2$, $R_5$ and $R_6$ are methyl groups is less stable thermally than a compound otherwise identical in structure but in which $R_1$, $R_2$, $R_5$ and $R_6$ are butyl groups. This principle will influence the choice of a particular temperature below about 50° C. for preparing any specific compound in the class of the less stable compounds of the invention.

The molar proportion of the enamine reactant to the ketene can be widely varied as the resulting cyclobutane product can be readily separated from excess or unreacted reactants. Substantially stoichiometric amounts of the reactants are more generally utilized in accordance with usual chemical practice. However, in the case of such ketenes or dimethylketene which readily dimerize, I prefer to utilize an excess of the enamine to reduce the amount of ketene dimer by-product. Enamines such as N,N-dimethylisobutyleneylamine react in the present process with equal molar proportions of such ketenes as dimethylketene as represented by the following equation:

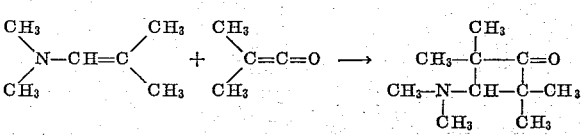

However, such enamines as 1,4-diisobutenylpiperazine react with two molar proportions of such ketenes as dimethylketene in the present process as represented by the following equation:

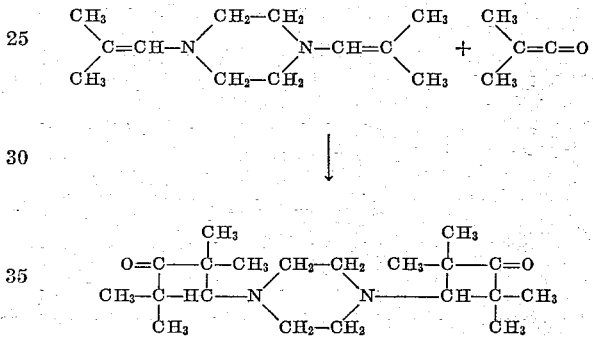

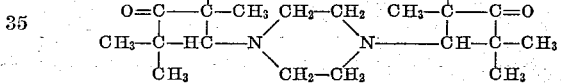

The subject reaction to prepare the cyclobutane derivatives of the invention proceeds readily in the absence of catalyst materials. The reaction can be conveniently effected by merely combining the reactants at room temperature. Reaction temperature in the range of about −80° C. to 200° C. can be utilized, although reaction temperatures of about 0° C. to 100° C. are preferred. As I have already indicated, if the ketene has an α-hydrogen atom or if the enamine has a β-hydrogen atom, the reaction temperature must be maintained below about 50° C. in order to obtain the substituted cyclobutanone product of the invention. The optimum reaction temperature varies with such factors as the thermal stability of the desired product and the reactivities of the enamine and the ketene, the higher temperatures being preferred for the higher molecular weight reactants.

The present reaction time can be widely varied. Typical reaction times vary from a few minutes to 24 hours to several days, the reaction time varying with such variables as the reaction temperature and the reactivity of the reactants.

The present reaction is conveniently effected under atmospheric pressure, although higher pressures or even subatmospheric pressures can be utilized.

The reaction of the invention can be run with or without a solvent. However, if a solvent is used, solvents that function as solvents for the reactants and the reaction products and which are substantially inert in the reaction are utilized in accordance with usual practice. Typical reaction solvents include aliphatic esters such as ethyl acetate, ethers such as diethyl ether and diisopropyl ether, chlorinated aliphatic hydrocarbons such as chloroform and carbon tetrachloride, and aliphatic and aromatic hydrocarbons such as n-hexane, n-octane, benzene and toluene.

The present reaction of the described enamines and ketenes proceeds in high yields to form the described cyclobutane derivatives. The cyclobutane derivative product can be worked-up or purified by conventional purification methods, the preferred method varying with the properties of the product. Particularly effective purification methods include fractional distillation under reduced pressure and fractional crystallization from solvents. However, other purification methods such as solvent extraction, chromatographic adsorption and the like can also be utilized.

The cyclobutane derivatives of the invention have both tertiary amine and ketone groups. The ketone group on such derivatives can be readily reduced to an alcohol group with an alkaline metal hydride such as sodium borohydride or the like. The resulting amino alcohol can then be converted to the corresponding methacrylate ester by reacting methacrylyl chloride therewith which, when copolymerized with acrylonitrile, results in a fiber-forming polymer that has better dyeability than unmodified polyacrylonitrile. The cyclobutane derivatives of the invention also are useful intermediates in the preparation of pharmaceuticals such as analgesics. The utility of the compounds of the invention is further disclosed in Brannock and Martin application titled "Tertiary Amino Alcohols of the Cyclobutane Series," Serial No. 71,398, filed November 25, 1960, now abandoned, and in the continuation-in-part application Serial No. 112,794 of the same applicants and title filed concurrently herewith.

It should be noted also that the amino alcohols prepared from the ketone compounds of the present invention have good thermal stability, even when prepared from the compounds having hydrogen atoms attached to a carbon atom adjacent to the carbonyl group. Accordingly, hydrogenation of the ketone to the corresponding alcohol provides a means for preserving the ring structure of the less stable compounds of the invention.

The invention is illustrated by the following examples of preferred embodiments thereof.

EXAMPLE 1

Into a 3-neck flask equipped with a stirrer and a Dry Ice condenser was charged 2400 g. (24 moles) of N,N-dimethylisobutenylamine. After the system was flushed with nitrogen, about 12 moles of dimethylketene was passed in over a period of 7 hrs. The reaction vessel was cooled in an ice bath. After standing for 24 hrs. at room temperature, the reaction solution was examined by gas chromatography and found to consist primarily of unreacted N,N-dimethylisobutenylamine, dimethylketene dimer and the product, 3-dimethylamino-2,2,4,4-tetramethylcyclobutanone, together with 2 minor components. Distillation through a 4-ft. Podbielniak Helipak column gave 1850 g. of recovered N,N-dimethylisobutenylamine and 842.7 g., B.P. 91°–92.5° C. (27.5 mm.), (purity 95% by gas chromatography) of 3-dimethylamino-2,2,4,4-tetramethylcyclobutanone. This is a yield of 86% based on N,N-dimethylisobutenylamine consumed. In order to obtain a sample for analysis some of the 95% material was dissolved in dilute hydrochloric acid, extracted with ether, neutralized with sodium hydroxide and extracted with ether. The organic layer was washed with water, then dried over anyhdrous magnesium sulfate and distilled through an 8-in. Vigreux column, B.P. 92° C. (27 mm.), $n_D^{20}$ 1.4439.

Analysis.—Calcd. for $C_{10}H_{19}NO$: C, 71.1; H, 11.2; N, 8.3; neut. equiv., 169. Found: C, 71.3; H, 11.2; N, 8.1; neut. equiv., 170.

EXAMPLE 2

To a solution of 210 g. (1.5 moles) of N-isobutenylpiperidine in 1000 ml. of ethyl ether at room temperature was added approximately 70 g. (1 mole) of dimethylketene. The reaction flask was stoppered and allowed to stand for two days at room temperature. Distillation of the reaction solution gave 125.2 g. of recovered N-isobutenylpiperidine and 94.3 g. (76% based on N-isobutenylpiperidine consumed) of 2,2,4,4-tetramethyl-3-piperidinocyclobutanone, B.P. 95–97° C. (4.2 mm.).

Analysis.—Calcd. for $C_{13}H_{23}NO$: C, 74.5; H, 11.0; N, 6.7. Found: C, 74.3; H, 11.2; N, 6.5.

EXAMPLE 3

To a solution of 99.0 g (1.0 mole) of N,N-dimethylisobutenylamine in 300 ml. of hexane was added at room temperature about 40 g. (0.48 mole) of ethylmethylketene. The reaction solution was stirred for 4 hr., then allowed to stand for 16 hr. at room temperature, and finally refluxed for 3 hr. Distillation of the resulting solution gave 61.3 g. of recovered N,N-dimethylisobutenylamine and 58.5 g. (84% based on N,N,-dimethylisobutenylamine consumed) of 3-dimethylamino-4-ethyl-2,2,4-trimethylcyclobutanone, B.P. 96° C. (25 mm.). This sample was about 96% pure by gas chromatography. After treatment by the method described in Example 1, the material was pure as determined by gas chromatography.

EXAMPLE 4

To 120 g. (0.67 mole) of 1-piperidylmethylenecyclohexane, which was stirred in a nitrogen atmosphere under a Dry Ice condenser, was added 0.67 mole dimethylketene. A rapid, exothermic reaction occurred, and the reaction was carried out for about 1 hour. There was isolated in good yield 2,2-dimethyl-3-piperidino-spiro-[3.5]nonan-1-one, M.P. 78–81° C. Recrystallization of an analytical sample from ethanol gave a material melting at 81–82.5° C.

Analysis.—Calcd, for $C_{16}H_{27}NO$: C, 77.1; H, 10.8; N, 5.6; neut. equiv., 249. Found: C, 77.1; H, 11.0; N, 5.4. neut, equiv., 250.

EXAMPLE 5

Following the manner of Example 4, N-isobutenylmorpholine and dimethylketene gave 2,2,4,4-tetramethyl-3-morpholinocyclobutanone, M.P. 58–59.5° C.

Analysis.—Calcd. for $C_{12}H_{21}NO_2$: C, 68.2; H, 10.0; N, 6.6. Found: C, 68.1; H, 9.9; N, 6.5.

EXAMPLE 6

Following the manner of Example 4, N-(2-ethyl-1-butenyl)piperidine and dimethylketene gave 2,2-diethyl-4,4-dimethyl-3-piperidinocyclobutanone, B.P. 110–112° C. (5 mm.).

Analysis.—Calcd. for $C_{15}H_{27}NO$: C, 76.0; H, 11.4; N, 5.9. Found: C, 75.8; H, 11.4; N, 5.8.

EXAMPLE 7

Following the manner of Example 4, N-isobutenyl-2,6-dimethylpiperidine and dimethylketene gave 2,2,4,4-tetramethyl - 3 - (2,6 - dimethylpiperidino)cyclobutanone, B.P. 97–100° C. (2.6 mm.).

Analysis.—Calcd. for $C_{15}H_{27}NO$: C, 76.0; H, 11.4; N, 5.9. Found: C. 75.7; H, 11.1; N, 6.1.

EXAMPLE 8

Using the general method described in Example 2, the following enamines and ketenes produced the tertiary-aminocyclobutanones set out in the table below.

dimethyl-2-ethyl-1-butenylamine in 200 ml. of benzene was added 23 g. (0.55 mole) of ketene at 0° C. The

Table

| Ketene | Enamine | Product | B.P., °C. (M.P., °C.)* |
|---|---|---|---|
| Dimethylketene | 3-isobutenyl-3-azabicyclo[3.2.2]nonane | 2,2,4,4-tetramethyl-3-(3-azabicyclo[3.2.2]nonan-3-yl)cyclobutanone. | *112–115 |
| Do | 1-isobutenyl-4-methylpiperazine | 2,2,4,4-tetramethyl-3-(4-methylpiperazino)cyclobutanone. | 105–107 (3. mm.) |
| Do | 1,4-diisobutenylpiperazine | 3,3'-(1,4-piperazinediyl)bis[2,2,4,4-tetramethylcyclobutanone]. | *256 (dec.) |
| Do | 5-dimethylaminomethylene-2-norbornene | 4-dimethylamino-3,3-dimethylspiro[cyclobutane-1, 2'-(5-norbornen)]-2-one. | 125–127 (5 mm.) |
| Do | 2-dimethylaminomethylene-2-(2,3-dihydro-4H pyran). | 4-dimethylamino-3,3-dimethylspiro[cyclobutane-1, 2'-(2',3'-dihydro-4'H pyran)]-2-one. | 100–103 (5 mm.) |
| Do | N,N-dibutylisobutenylamine | 3-dibutylamino-2,2,4,4-tetramethylcyclobutanone. | 125–127 (1 mm.) |
| Do | 1-isobutenyl-4-ethyl-2,5-dimethylpiperazine | 2,2,4,4-tetramethyl-3-(4-ethyl-2,5-dimethylpiperazino)cyclobutanone. | 140–143 (2.5 mm.) |
| Do | 2-(2-dimethylamino-1-ethylvinyl)thiophene | 3-dimethylamino-2-ethyl-4,4-dimethyl-2-(2-thienyl)cyclobutanone. | 108 (5 mm.) |
| Do | 2-dimethylamino-1,1-diphenylethylene | 3-dimethylamino-2,2-dimethyl-4,4-diphenylcyclobutanone. | *120–121 |
| Ethylmethyl-ketene | N-isobutenylmorpholine | 2-ethyl-2,4,4-trimethyl-3-morpholinocyclobutanone. | 101–103 (1.3 mm.) |
| Diethylketene | N,N-dimethylisobutenylamine | 3-dimethylamino-2,2-diethyl-4,4-dimethylcyclobutanone. | 95–98 (8 mm.) |
| Do | N,N-dimethyl-2-ethyl-1-butenylamine | 3-dimethylamino-2,2,4,4-tetraethylcyclobutanone. | 107–110 (5. mm.) |
| Do | N-(2-ethyl-1-butenyl)-piperidine | 3-piperidino-2,2,4,4-tetraethylcyclobutanone. | 130–132 (1.5 mm.) |
| Do | N-isobutenylmorpholine | 3-morpholino-2,2-diethyl-4,4-dimethylcyclobutanone. | 118–120 (5 mm.) |
| Methylpropyl ketene | N,N-dimethylisobutenylamine | 3-dimethylamino-2,2,4-trimethyl-4-propylcyclobutanone. | 94–96 (8 mm.) |
| Do | N,N-dimethyl-2-ethyl-1-butenylamine | 3-dimethylamino-2,2-diethyl-4-methyl-4-propylcyclobutanone. | 105 (5 mm.) |
| Butylethylketene | N,N-dimethylisobutenylamine | 3-dimethylamino-2-butyl-2-ethyl-4,4-dimethylcyclobutanone. | 103–105 (2 mm.) |
| Diheptylketene | do | 3-dimethylamino-2,2-diheptyl-4,4-dimethylcyclobutanone. | 158–159 (2 mm.) |
| Ethyldodecylketene | do | 3-dimethylamino-2-dodecyl-2-ethyl-4,4-dimethylcyclobutanone. | 153–156 (1.5 mm.) |
| Pentamethyleneketene | N-isobutenylpiperidine | 2,2-dimethyl-3-piperidinospiro[3,5]nonanone. | *81–82 |
| Diphenylketene | N,N-dimethylisobutenylamine | 3-dimethylamino-2,2-dimethyl-4,4-diphenylcyclobutanone. | *120–122 |
| Do | N,N-dimethyl-2-ethyl-1-butenylamine | 3-dimethylamino-2,2-diethyl-4,4-diphenylcyclobutanone. | *102–104 |
| Methylphenylketene | N,N-dimethylisobutenylamine | 3-dimethylamino-2,2,4-trimethyl-4-phenylcyclobutanone. | 110 (2 mm.) |
| Allylmethylketene | do | 2-allyl-3-dimethylamino-2,4,4-trimethylcyclobutanone. | 93–98 (7 mm.) |
| Ethylcarbethoxyketene | do | 2-carbethoxy-3-dimethylamino-2-ethyl-4,4-dimethylcyclobutanone. | 140–143 (0.5 mm.) |
| Dimethylketene | N,N-dimethyl-2-methyl-1-octenylamine | 3-dimethylamino-2-hexyl-2,4,4-trimethylcyclobutanone. | 120–122 (2 mm.) |

EXAMPLE 9

Into a stirred solution of 69.5 g. (0.5 mole) of N-(1-butenyl)piperidine in 200 ml. of ether was passed 25.5 g. (0.6 mole) of ketene at −20° C. The reaction solution was stirred at −20° C. for 1 hr. after the addition. An infrared spectrum of the solution showed a band at $5.65\mu$ that is characteristic of cyclobutanones. Thus, the reaction mixture was a solution of 2-ethyl-3-piperidinocyclobutanone. This compound is thermally unstable, but can be trapped in a stable form by reducing it with lithium aluminum hydride to 2-ethyl-3-piperidinocyclobutanol.

EXAMPLE 10

To a stirred solution of 69.5 g. (0.5 mole) of N-butenylpiperidine in 200 ml. of ether was added 35 g. (0.5 mole) of dimethylketene. The reaction temperature was kept at −20 to 0° C. during the addition, and for 1 hour after the addition was complete. An infrared spectrum showed that the reaction mixture was a solution of 2-ethyl-4,4-dimethyl-3-piperidinocyclobutanone.

EXAMPLE 11

To a stirred solution of 49.5 (0.5 mole) of N,N-dimethylisobutenylamine in 200 ml. of ether was added 23.5 g. (0.56 mole) of ketene at −25 to −15° C. The temperature was kept at −20° C. for an additional hour. An infrared spectrum showed that the reaction mixture was a solution of 2,2-dimethyl-3-dimethylaminocyclobutanone.

EXAMPLE 12

To a stirred solution of 60 g. (0.47 mole) of N,N-dimethyl-2-ethyl-1-butenylamine in 200 ml. of benzene was added 23 g. (0.55 mole) of ketene at 0° C. The temperature was kept at 0° C. for an additional 2 hr. An infrared spectrum showed that the reaction mixture was a solution of 2,2-diethyl-3-dimethylaminocyclobutanone.

EXAMPLE 13

Using the method described in Example 9, the following enamines and ketenes gave the products indicated:

| Ketene | Enamine | Product |
|---|---|---|
| Ketene | N-isobutenyliminodipropionitrile. | 3,3'-(2,2-dimethyl-3-oxocyclobutylimino)dipropionitrile. |
| Do | N-isobutenyldibenzylamine. | 3-dibenzylamino-2,2-dimethylcyclobutanone. |
| Do | N,N-dimethylvinylamine. | 3-dimethylaminocyclobutanone. |
| Do | N,N-dimethylpropenylamine. | 3-dimethylamino-2-methylcyclobutanone. |
| Dimethylketene | N,N-dimethylvinylamine. | 3-dimethylamino-2,2-dimethylcyclobutanone. |
| Diphenylketene | N-(1-butenyl)piperidine. | 3-piperidino-4-ethyl-2,2-diphenylcyclobutanone. |

EXAMPLE 14

To a stirred solution of 50 g. (0.3 mole) of 3-dimethylamino-2,2,4,4-tetramethylcyclobutanone in 75 ml. of ethanol was added slowly a solution of 3.8 g. (0.1 mole) of sodium borohydride in 25 ml. of water. The reaction was exothermic, but the temperature was kept at 25–30° C. by means of a water bath. The reaction mixture was stirred for 1 hr. after the addition was complete, then heated in an evaporating dish on the steam bath for 1 hr. To this residue was added 300 ml. of ether. The ether layer was separated, washed with water and dried over anhydrous magnesium sulfate. Evaporation of this solution yielded 46.8 g. (92%) of 3-dimethylamino-2,2,4,4-tetramethylcyclobutanol as a white crystalline solid. To prepare a sample for analysis, some of this solid was dissolved in warm hexane and the solution chilled in Dry Ice to precipitate the solid. A material of M.P. 70–72° C. was obtained by rapid filtration of this solution.

*Analysis.*—Calcd. for $C_{10}H_{21}NO$: C, 70.3; H, 12.3; N, 8.2; neut. equiv., 171. Found: C, 70.3; H, 12.5; N, 8.1; neut. equiv., 171.8.

EXAMPLE 15

To a stirred refluxing solution of 34.2 g. (0.2 mole) of 3-dimethylamino-2,2,4,4-tetramethylcyclobutanol in 200 ml. of benzene was added dropwise a solution of 20.9 g. (0.2 mole) of methacrylyl chloride in 50 ml. of benzene. The addition required 30 min. and refluxing was continued for an additional 30 min. After cooling, 100 ml. of water was added. The solution was then neutralized with sodium bicarbonate solution. The organic layer was separated, washed with water and dried over anhydrous magnesium sulfate. Distillation of this solution through a 6-in. Vigreux column gave 38.3 g. (80%) of 3-dimethylamino - 2,2,4,4 - tetramethylcyclobutanol methacrylate, B.P. 71–74° C. ( 1 mm.).

EXAMPLE 16

A mixture consisting of 38 g. of acrylonitrile, 2 g. of 3-dimethylamino-2,2,4,4-tetramethylcyclobutanol methacrylate, 0.14 g. of the hydrochloride of 2,2'-diguanyl-2,2'-azopropane, 0.4 g. lauryl sulfate and 160 ml. of water was sealed in a bottle under an atmosphere of nitrogen and tumbled in a 65° C. water bath for 18 hrs. The resulting emulsion was broken with sodium sulfate. The polymer was isolated by filtration and washed thoroughly with water. The dried polymer weighed 28.8 g. (72%). Elemental analysis indicated that the material was a copolymer of acrylonitrile and 3-dimethylamino-2,2,4,4-tetramethylcyclobutanol methacrylate. This polymer was dissolved in dimethylformamide and dry spun to give strong fibers. These fibers were more readily dyeable and exhibited a better affinity for dyes than did unmodified polyacrylonitrile fibers.

The present invention thus provides a new and useful class of cyclobutane derivatives.

The invention has been described in detail with particular reference to preferred embodiments thereof, but it will be understood that variations and modifications can be effected within the spirit and scope of the invention as described hereinabove and as defined in the appended claims.

I claim:

1. A cyclobutane derivative having the formula:

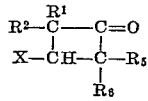

wherein X is a tertiaryamino group having the formula selected from the class consisting of:

(a) 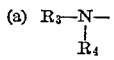

and (b) 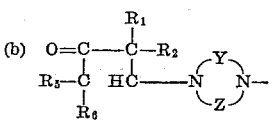

wherein Y and Z are each alkylene of 2 to 4 carbon atoms; wherein $R_1$, $R_2$, $R_5$ and $R_6$, when taken singly, are each selected from the group consisting of:
(a) hydrogen,
(b) alkyl of 1 to 18 carbon atoms,
(c) phenyl,
(d) lower alkyl substituted phenyl,
(e) benzyl,
(f) allyl,
(g) carbalkoxy wherein the alkyl moiety is lower alkyl, and
(h) thienyl;

and wherein the substituents $R_1$ and $R_2$, and $R_5$ and $R_6$, when taken collectively with the carbon atom to which they are attached, represent a member selected from the group consisting of:

(a) 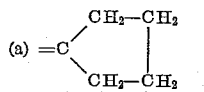

(b) 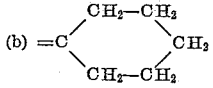

(c) 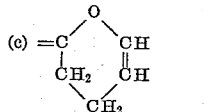

(d) 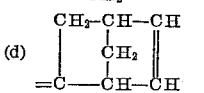

and (e) 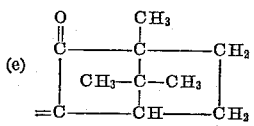

wherein $R_3$ and $R_4$, when taken singly, are each selected from the group consisting of:
(a) alkyl of 1 to 8 carbons,
(b) benzyl, and
(c) cyanoethyl, and wherein the substituents $R_3$ and $R_4$, when taken collectively with the nitrogen atom to which they are attached, represent a member selected from the group consisting of:

(a) 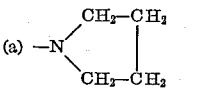

(b) 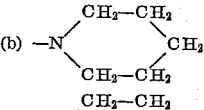

(c) 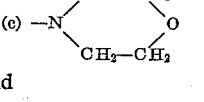

and (d) 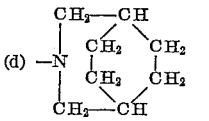

2. A cyclobutane derivative having the formula

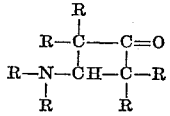

wherein R is alkyl having 1 to 8 carbon atoms.

3. 3-dimethylamino-2,2,4,4-tetramethylcyclobutanone.

4. 2,2,4,4-tetramethyl-3-piperidinocyclobutanone.

5. 3-dimethylamino-4-ethyl-2,2,4 - trimethylcyclobutanone.
6. 2,2,4,4-tetramethyl-3-morpholinocyclobutanone.
7. 2,2-diethyl-4,4-dimethyl-3-piperidinocyclobutanone.
8. 2-ethyl-3-piperidinocyclobutanone.
9. 2-ethyl-4,4-dimethyl-3-piperidinocyclobutanone.
10. 2,2-dimethyl-3-dimethylaminocyclobutanone.
11. 2,2-diethyl-3-dimethylaminocyclobutanone.
12. The process which comprises reacting a compound having the formula:

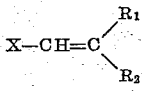

with a compound having the formula:

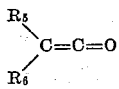

and forming a cyclobutane derivative having the formula:

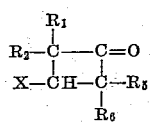

wherein X is a tertiaryamino group having the formula selected from the class consisting of:

(a) 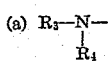

and (b) 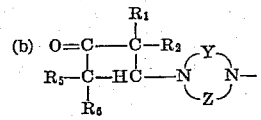

wherein Y and Z are each alkylene of 2 to 4 carbon atoms; wherein $R_1$, $R_2$, $R_5$ and $R_6$, when taken singly, are each selected from the group consisting of:
(a) hydrogen,
(b) alkyl of 1 to 18 carbon atoms,
(c) phenyl,
(d) lower alkyl substituted phenyl,
(e) benzyl,
(f) allyl,
(g) carbalkoxy wherein the alkyl moiety is lower alkyl, and
(h) thienyl;

and wherein the substituents $R_1$ and $R_2$, and $R_5$ and $R_6$, when taken collectively with the carbon atom to which they are attached, represent a member selected from the group consisting of:

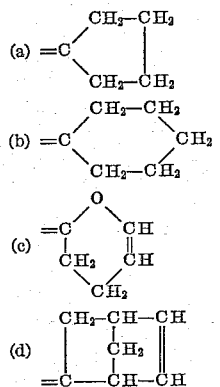

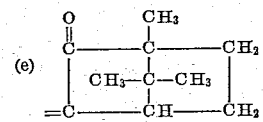

wherein $R_3$ and $R_4$, when taken singly, are each selected from the group consisting of:
(a) alkyl of 1 to 8 carbons,
(b) benzyl, and
(c) cyanoethyl, and wherein the substituents $R_3$ and $R_4$, when taken collectively with the nitrogen atom to which they are attached, represent a member selected from the group consisting of:

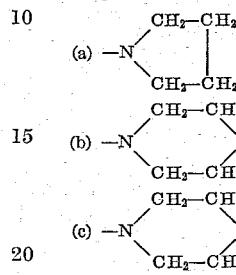

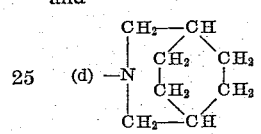

the reaction temperature being in the range of $-80°$ C. to $200°$ C. when none of the substituents $R_1$, $R_2$, $R_5$ and $R_6$ are hydrogen and in the range of $-80°$ C. to less than the temperature of thermal decomposition of the tertiary-amino cyclobutanone when at least one of the substituents $R_1$, $R_2$, $R_5$ and $R_6$ is hydrogen.

13. The process which comprises reacting a compound having the formula

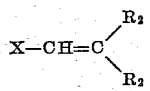

with a compound having the formula:

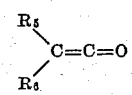

and forming a cyclobutane derivative having the formula:

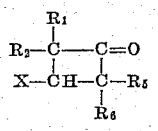

wherein X is a tertiaryamino group having the formula selected from the class consisting of:

(a) 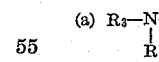

and (b) 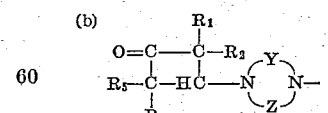

wherein Y and Z are each alkylene of 2 to 4 carbon atoms; wherein $R_1$, $R_2$, $R_5$ and $R_6$, when taken singly, are each selected from the group consisting of:
(a) hydrogen,
(b) alkyl of 1 to 18 carbon atoms,
(c) phenyl,
(d) lower alkyl substituted phenyl,
(e) benzyl,
(f) allyl,
(g) carbalkoxy wherein the alkyl moiety is lower alkyl, and
(h) thienyl;

wherein the substituents $R_1$ and $R_2$, and $R_5$ and $R_6$, when taken collectively with the carbon atom to which they are attached, represent a member selected from the group consisting of:

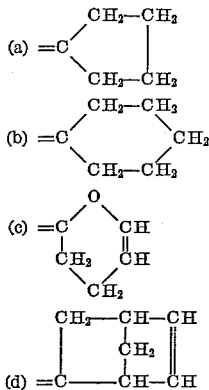

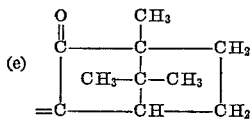

wherein $R_3$ and $R_4$, when taken singly, are each selected from the group consisting of:
(a) alkyl of 1 to 8 carbons,
(b) benzyl, and
(c) cyanoethyl and wherein the substituents $R_3$ and $R_4$, when taken collectively with the nitrogen atom to which they are attached, represent a member selected from the group consisting of:

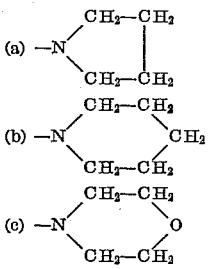

and

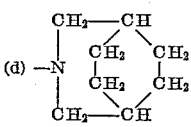

the reaction temperature being in the range of $-80°$ C. to $200°$ C. when none of the substituents $R_1$, $R_2$, $R_5$ and $R_6$ are hydrogen and in the range of $-80°$ C. to less than $10°$ C. when at least one of the substituents $R_1$, $R_2$, $R_5$ and $R_6$ is hydrogen.

14. The process which comprises reacting a compound having the formula

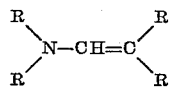

with a compound having the formula

at a temperature in the range of $0°$ C. to $100°$ C. and forming a cyclobutane derivative having the formula

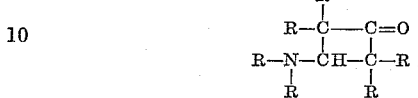

wherein R is an alkyl radical having 1 to 8 carbon atoms.

15. The process which comprises reacting a compound having the formula

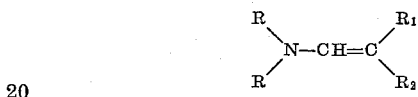

with a compound having the formula

at a temperature in the range of $-80°$ C. to $10°$ C. and forming a cyclobutane derivative having the formula

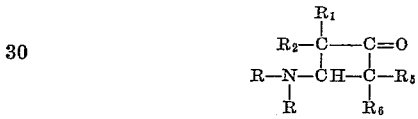

wherein R is an alkyl radical having 1 to 8 carbon atoms and wherein $R_1$, $R_2$, $R_5$ and $R_6$ are selected from the class consisting of hydrogen and alkyl radicals having 1 to 8 carbon atoms, at least one of said $R_1$, $R_2$, $R_5$ and $R_6$ being hydrogen.

16. The process which comprises reacting dimethylketene with N,N-dimethylisobutenylamine at a temperature in the range of $0°$ C. to $100°$ C. and forming 3-dimethylamino-2,2,4,4-tetramethylcylobutanone.

17. The process which comprises reacting dimethylketene with N-isobutenylpiperidine at a temperature in the range of $0°$ C. to $100°$ C. and forming 2,2,4,4-tetramethyl-3-piperidinocyclobutanone.

18. The process which comprises reacting ethylmethylketene with N,N-dimethylisobutenylamine at a temperature in the range of $0°$ C. to $100°$ C. and forming 3-dimethylamino-4-ethyl-2,2,4-trimethylcyclobutanone.

19. The process which comprises reacting dimethylketene with N-isobutenylmorpholine at a temperature in the range of $0°$ C. to $100°$ C. and forming 2,2,4,4-tetramethyl-3-morpholinocyclobutanone.

20. The process which comprises reacting dimethylketene with N-(2-ethyl-1-butenyl)piperidine at a temperature in the range of $0°$ C. to $100°$ C. and forming 2,2-diethyl-4,4-dimethyl-3-piperidinocyclobutanone.

References Cited by the Examiner

UNITED STATES PATENTS 3,051,622  8/62  Kuna et al. _____ 260—563 X

OTHER REFERENCES

Opitz et al. Angew. Chem., Vol. 73 p. 654 (1961).

IRVING MARCUS, *Primary Examiner.*

WALTER A. MODANCE, *Examiner.*